United States Patent [19]

Lee

[11] Patent Number: 5,267,115
[45] Date of Patent: Nov. 30, 1993

[54] APPARATUS AND METHOD FOR COUNTING TAPE RUNNING TIME OF VIDEO TAPE RECORDERS

[75] Inventor: Taek H. Lee, Kyungki, Rep. of Korea

[73] Assignee: Samsung Electronics Co. Ltd., Rep. of Korea

[21] Appl. No.: 818,284

[22] Filed: Jan. 9, 1992

[30] Foreign Application Priority Data

Jan. 9, 1991 [KR] Rep. of Korea .................. 91-221

[51] Int. Cl.⁵ ................. G11B 27/34; G11B 15/18
[52] U.S. Cl. .................................. 360/137; 360/71; 360/72.1
[58] Field of Search .............. 360/137, 71, 72.1-72.3

[56] References Cited

U.S. PATENT DOCUMENTS

| | | | |
|---|---|---|---|
| 4,357,643 | 11/1982 | de Costemore d'Arc | 360/137 |
| 4,399,527 | 8/1983 | Titus, IV et al. | 360/72.1 X |
| 4,423,455 | 12/1983 | Fukuoka | 360/137 |
| 4,532,560 | 7/1985 | Williams | 360/72.3 |
| 5,018,040 | 5/1991 | Nishida | 360/137 |

*Primary Examiner*—John H. Wolff
*Attorney, Agent, or Firm*—Sughrue, Mion, Zinn, Macpeak & Seas

[57] ABSTRACT

A tape running time counting apparatus for video tape recorder includes a detecting device for detecting the existence or absence of playback control signals on a video tape, a pulse generating device for generating pulses proportionate to the rotational speed of one of a supply and a takeup reel and a counting device for counting real time of running of the video tape based on the playback control signals, when present, and for calculating the real time of running of the video tape after converting the number of pulses from pulse generating device in the absence of the playback control signals. If playback control signals are recorded the video tape, the tape running time is counted in real time based on the control signals. If the control signals are not recorded, the number of pulses which correspond to the rotational speed of the supply and/or take-up reel is converted into real time, thereby computing the tape running time. A method for count real time running of a tape is also disclosed.

10 Claims, 2 Drawing Sheets

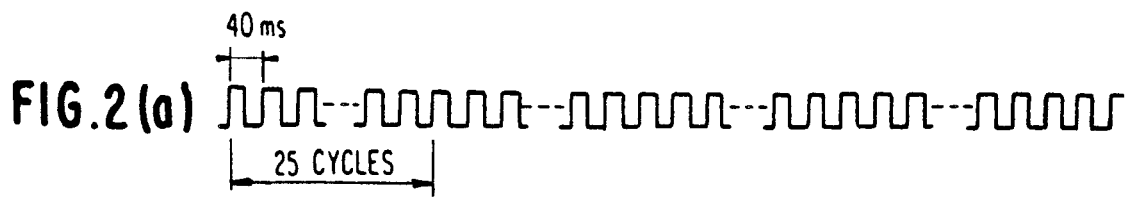
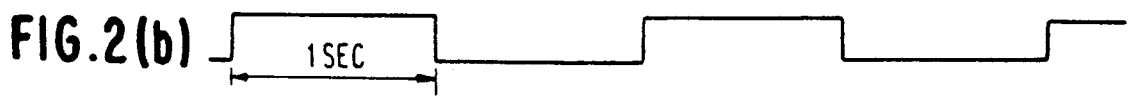
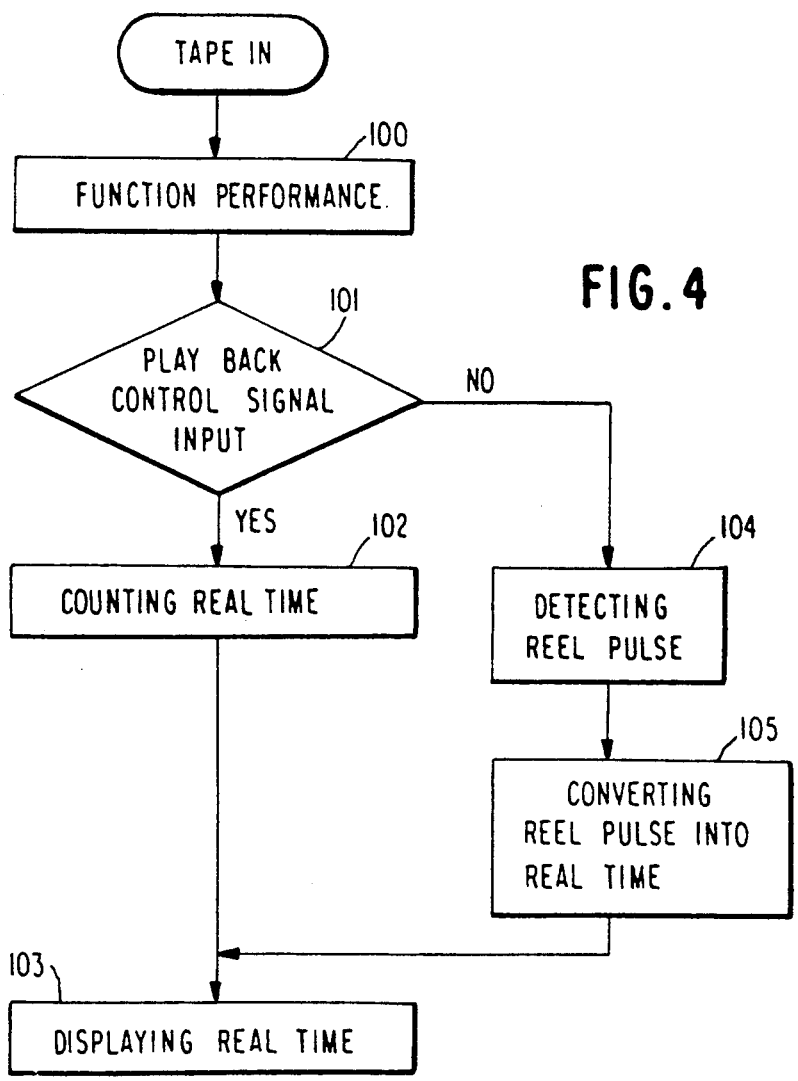

APPARATUS AND METHOD FOR COUNTING TAPE RUNNING TIME OF VIDEO TAPE RECORDERS

FIELD OF THE INVENTION

The present invention relates to an apparatus and method for counting a tape running time for video tape recorders, and, more specifically, to a method and apparatus for counting a tape running time wherein the running time of the tape is counted by means of reel pulses which are generated in accordance with the playback control signals recorded on the tape or proportionate to the revolutions of the supply and take-up reels.

BACKGROUND OF THE INVENTION

Generally, tape running time counting apparatus (hereinafter counter) for known video tape recorders are operated in such a manner that, when the counted number reaches a preset value, the real time output is provided in units of time, e.g., seconds, after counting the playback control signals recorded on the playback tracks of a video tape. However, in such a counter, if playback control signals are absent or only partially recorded on the video tape, then the tape running time can not be counted over the interval where there are no playback control signals.

In another conventional counter, reel rotation pulses generated from the deck of the video tape recorder are picked up, and counted to show the amount of tape which has already run through the deck. However, this apparatus does not furnish a time output, but only a quantity or length output of the tape already run.

SUMMARY OF THE INVENTION

The present invention was motivated by a desire to overcome the above described disadvantages of the conventional techniques.

Therefore, it is the object of the present invention to provide an apparatus and method for counting a tape running time of video tape recorders, in which a real time counting method is adopted upon the presence of playback control signals on the tape of the video tape recorder, and on the other hand, if there are no playback control signals on the video tape, the running time is counted after converting the running distance of the tape into a running time based on the reel pulses from the deck, thereby making it possible to count the tape running time regardless of the existence or absence of playback control signals on the video tape.

In achieving the above object, a counter for video tape recorders according to the present invention includes a device for detecting the existence or absence of playback control signals on the video tape, a device for generating pulses proportionate to the rotational speed of at least one of the supply and take-up reels, and a device for counting the tape running real time in accordance with the playback control signals upon detecting the playback control signals by the detecting device, and for counting the tape running real time after converting the number of pulses from the pulse generating device into the real time upon failure to detect playback control signals.

The method for counting the tape running time of video tape recorders according to the present invention includes the steps of detecting the existence or absence of playback control signals on a video tape, generating pulses proportionate to the rotational speed of at least one of a supply and a take-up reel, and counting the real time of the running of the tape from said playback control signals upon detecting the playback control signals, and from the number of the pulses upon absence of said playback control signals.

BRIEF DESCRIPTION OF THE DRAWINGS

The above object and other advantages of the present invention will become more apparent by describing in detail the preferred embodiment of the present invention with reference to the attached drawings, in which:

FIG. 2 shows illustrative wave patterns of playback control and clock signals produced in real time for explaining the operation of the counting method according to the present invention;

FIG. 3 is a conceptual illustration showing the reel pulse for further explaining the operation of the counting method; and FIG. 4 is a flow chart showing steps of a counting method according to the present invention.

DESCRIPTION OF THE PREFERRED EMBODIMENT

Figure 1A:
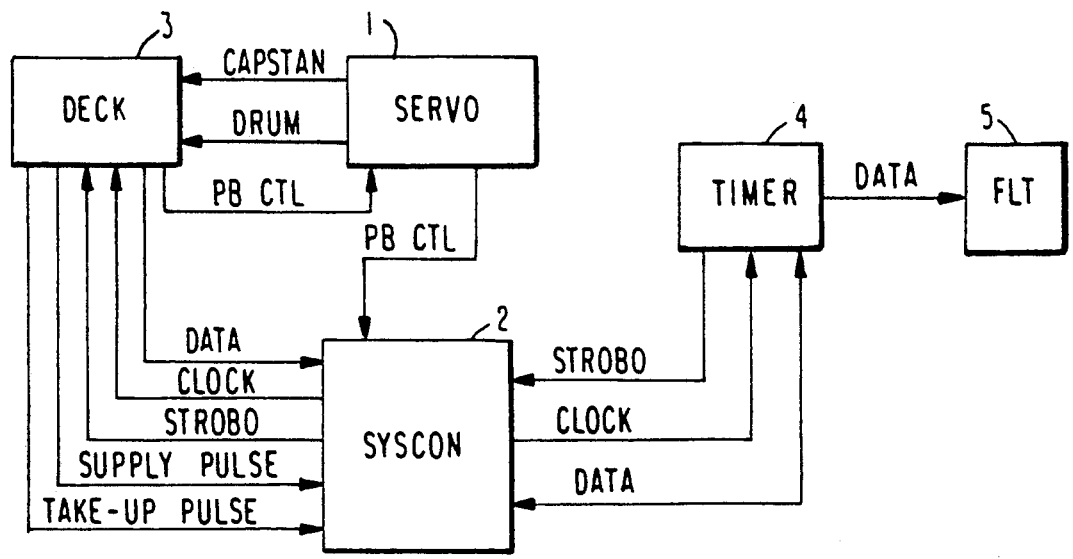
FIG. 1(a) is a block diagram showing the construction of the tape running time counting apparatus according to the present invention.
Figure 1B:
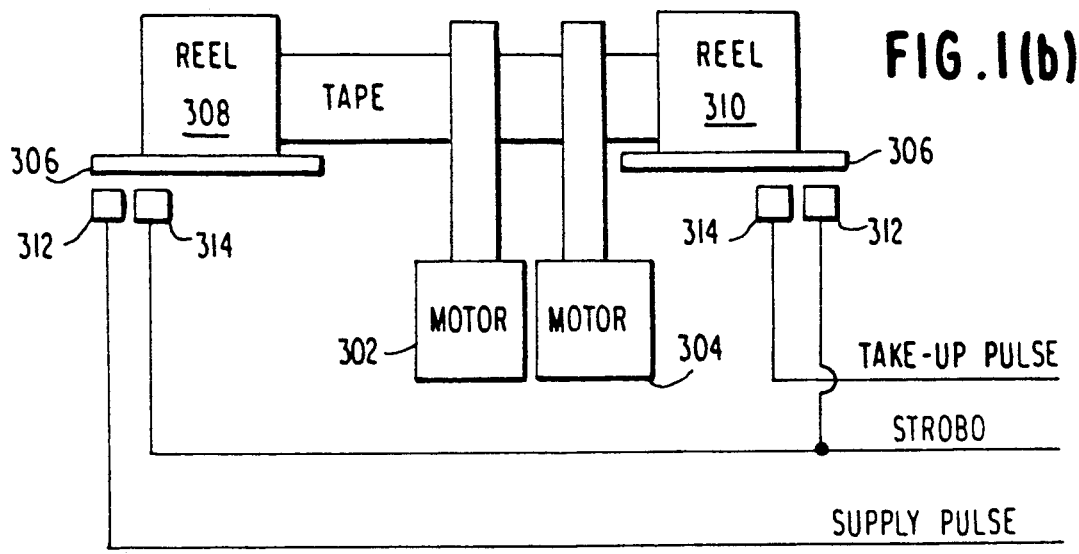
FIG. 1(b) is an illustrative block diagram of selected portions of the deck shown in FIG. 1(a)

The counter according to the present invention will now be explained while referring to FIGS. 1(a) and 1(b). FIG. 1(a) is a block diagram showing the construction of the counter according to the present invention. FIG. 1(b) is a block diagram of selected portions of a deck 3, which is part of the counter of FIG. 1(a).

Reference code 1 indicates a servo device for a video tape recorder. Servo device 1 detects playback control signals (recorded on the tape) in order to supply the detected data to a microcomputer system controller 2, and controls a head motor 302 and a capstan motor 304 of deck 3, as shown in FIG. 1(b), based on the detected playback control signals. The deck 3 moves the tape at constant speeds under different modes (REC, PLAY, FF, REW) in accordance with control signal provided by servo device 1.

Figure 1C:
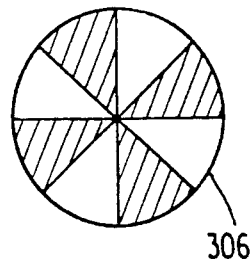
FIG. 1(c) is an illustrative view of a disc used in the portion of the deck shown in FIG. 1(b)

Referring to FIGS. 1(b) and 1(c), black and white dividing (strobe) discs 306 associated with supply and takeup reels 308, 310, respectively, revolve in response to an optical device and a strobetron are controlled by system controller 2, as discussed in greater detail below. Consequently, electrical reel rotation pulse signals are generated proportionate to the rotational speed of the reel, and are supplied to system controller 2. After receipt of the playback signals from the servo device or the reel pulse signals from the deck 3, system controller 2 counts the running time of the tape, and supplies the counted data through a clock terminal to a timer 4. The timer 4 displays the current tape running real time through a display 5. Preferably, display 5 is a digital display device.

The operation of counting the tape running time by system controller 2 based on the playback control signals and the reel pulses will be described below referring to FIGS. 2 and 3.

FIG. 2 illustrates wave patterns in order to show the operation of counting the tape running real time based on the playback control signals during playback in a video tape recorder. FIG. 2(a) illustrates the wave pattern of the playback control signal supplied from the servo device 1 to system controller 2, while FIG. 2(b) illustrates the wave pattern of the clock signals supplied through a clock terminal of system controller 2 to the timer 4, after changing the logic each time a fixed number of playback signals is detected.

System controller 2 detects the existence or absence of playback control signals supplied from the servo device 1, and, if playback control signals are detected, system controller 2 counts the number of the cycles of the playback control signals as shown in FIG. 2(a). If one cycle is 40 ms, in an exemplary case, system controller 2 changes its logic once for every 25 cycles, i.e., once each second, and outputs clock signals through its clock terminal to the timer 4. After receipt of the clock signals, the timer 4 displays the tape running real time through the display 5.

FIG. 3 is a conceptional drawing in which there is illustrated the operation of counting the tape running real time by utilizing the reel pulses supplied from the reel pulse generating means of the deck 3, in the event that there is no playback control signal (supplied to system controller 2 after being detected by the servo device 1).

In accordance with the strobe control signals, optical beams are projected from one of more light emitting elements 312 to the black and white dividing discs 306, which advantageously are installed on the supply and-/or take-up reels 308, 310, as shown in FIG. 1(b). Discrete reflected optical beams from the black and white dividing discs 306 are converted by one or more optical detecting devices 314 into electrical reel pulse signals, as shown in FIG. 3. Light emitting elements 312 and optical detecting devices advantageously can be photodiodes and photo-detectors, respectively, or similar devices known to those of ordinary skill in the art. After receipt of the reel pulse signals, system controller 2 detects the delay time between the pulses, i.e., the period, and then computes the rotational speed of each reel 308, 310 based thereon. Then, based on the computed rotational speed, system controller 2 counts the tape running distance, and the real time corresponding to the distance.

Now the operation of counting the tape running distance and the real time based on the reel rotation pulse signals by system controller 2 will be described. It will be assumed that the black and white dividing discs 306 of the pulse generating means are each divided into four sections of each color, as shown in FIG. 1(c).

First, the tape running quantity X is defined as follows.

$$X = Vt \tag{1}$$

where V represents the angular velocity of the reel, i.e., the tape supplying or winding speed, and t represents the time of the running of the tape.

The angular velocity V has constant values under different modes, and therefore, the running distance per unit time $x_{ctl}$ is defined as follows.

$$x_{ctl} \text{(mm/sec)} = V \text{(mm/sec)} \tag{2}$$

Therefore, the tape running distance X for t seconds can be defined as follows.

$$X = Vt = x_{ctl} t \tag{3}$$

Then, the period $\alpha$ and the number n of the pulses are computed and counted based on the reel pulses supplied from the reel pulse generating means and system controller 2. Therefore, the following relation can be established, $$t = \alpha n$$

and therefore, $$X = x_{ctl} t = x_{ctl} \alpha n \tag{4}$$

If the tape running distance X, which is calculated based on Formula (4) is equated with the running distance per unit of time $x_{ctl}$, that is, if it is assumed that $t = 1$, the number $n_u$ of the pulses per unit of time can be calculated. That is, $$n_u = \frac{1}{\alpha} \text{ (pulses)}. \tag{5}$$

Therefore, system controller 2 counts the reel pulses generated from the deck 3 for $1/\alpha$ times, and then, system controller 2 outputs clock signals to the timer 4 in order to increment the real time by 1 second. Accordingly, system controller 2 determines the number of the reel pulses (generated from the deck 3) for the time during which the tape runs distance corresponding to one second, and thus, system controller 2 supplies the detected number of the pulses through the clock terminal to the timer 4.

FIG. 4 is a flow chart showing the operation of the counter according to the present invention. First, after a video tape is installed on the deck 3, when the video tape recorder performs a functional mode such as playback mode during step 100, system controller 2 checks to determine whether the playback control signals, which are supplied from the servo device 1, are recorded on the tape or not during step 101. If the control signals are recorded on the tape, the control signals are divided into lots of 25 to carry out a real time counting method in which one second of real time is incremented during step 102. On the other hand, if there are no playback control signals, the reel pulses, which are supplied from the deck 3, are counted during step 104, and then, the reel pulses are converted into real time based on Formulas 1-5 during step 105.

Meanwhile, system controller 2, which has calculated the real time based on the control signals from the servo device 1 and based on the reel pulses from the deck 3, outputs clock signals corresponding to one second of real time to the timer 4, and the timer 4 in turn supplies the relevant running time to the display 5, so that the tape running time can be displayed.

According to the present invention as described above, the counter is not only capable of calculating the tape running time by detecting the playback control signals recorded on the tape, but is also capable of calculating the real time of the running of the tape based on the reel pulses, even in the case where there are no playback control signals recorded on the tape. Thus the counter according to the present invention is capable of continuously displaying the tape running time.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A tape running time counting apparatus for video tape recorders, comprising:
    detecting means for detecting the existence or absence of playback control signals on a video tape;
    pulse generating means for generating pulses proportionate to the rotational speed of at least one of a supply and a takeup reel; and
    counting means for counting real time of running of the video tape based on said playback control signals upon detecting said playback control signals by said detecting means, and for calculating said real time of running of the video tape after converting the number of said pulses from said pulse generating means upon absence of said playback control signals.

2. The tape running time counting apparatus for video tape recorders as claimed in claim 1, wherein said counting means includes means for generating signals in units of seconds upon detecting a preset number of playback control signals.

3. The tape running time counting apparatus for video tape recorders as claimed in claim 2, wherein said counting means includes means for detecting the number of pulses from said pulse generating means corresponding to a running distance during one second, and for generating signals in units of seconds.

4. The tape running time counting apparatus for video tape recorders as claimed in claim 3, further comprising a means for displaying the tape running time upon receipt of signals from said counting means.

5. The tape running time counting apparatus for video tape recorders as claimed in claim 2, further comprising a means for displaying the tape running time upon receipt of signals from said counting means.

6. The tape running time counting apparatus for video tape recorders as claimed in claim 1, further comprising a means for displaying the tape running time upon receipt of signals from said counting means.

7. A method for mounting a tape running time of video tape recorders, comprising the steps of:
    detecting the existence or absence of playback control signals on a video tape;
    generating pulses proportionate to the rotational speed of at lease one of a supply and a take-up reel; and
    counting a real time of running of the video tape from said playback control signals upon detecting said playback control signals, and from the number of said pulses upon absence of said playback control signals.

8. The method for counting a tape running time of video tape recorders as claimed in claim 7, wherein said real time of running of the video tape is counted in unit of seconds.

9. The method for counting a tape running time of video tape recorders as claimed in claim 8, further comprising the step of displaying the counted real time of running of the video tape.

10. The method for counting a tape running time of video tape recorders as claimed in claim 7, further comprising the step of displaying the counted real time of running of the video tape.

* * * * *